(12) United States Patent
Johnson, Sr. et al.

(10) Patent No.: US 12,124,154 B2
(45) Date of Patent: *Oct. 22, 2024

(54) EXTENDIBLE L-PLATE FOR CAMERA EQUIPMENT

(71) Applicant: Really Right Stuff, LLC, Lehi, UT (US)

(72) Inventors: Joseph M. Johnson, Sr., Lehi, UT (US); Matthew L. Burk, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,517

(22) Filed: Jan. 25, 2022

(65) Prior Publication Data

US 2022/0146914 A1    May 12, 2022

Related U.S. Application Data

(63) Continuation of application No. 16/731,540, filed on Dec. 31, 2019, now Pat. No. 11,269,239, which is a
(Continued)

(51) Int. Cl.
*G03B 17/56* (2021.01)
*F16M 11/04* (2006.01)
(Continued)

(52) U.S. Cl.
CPC ......... *G03B 17/561* (2013.01); *F16M 11/041* (2013.01); *F16M 11/046* (2013.01); *F16M 11/105* (2013.01); *F16M 11/14* (2013.01);

*F16M 11/2078* (2013.01); *F16M 13/00* (2013.01); *F16M 13/022* (2013.01)

(58) Field of Classification Search
CPC .................................................. G03B 17/563
See application file for complete search history.

(56) References Cited

U.S. PATENT DOCUMENTS

| | | | | |
|---|---|---|---|---|
| 2,589,892 A | * | 3/1952 | Suzukawa | G03B 15/041 248/187.1 |
| 6,027,085 A | | 2/2000 | Ruther | |

(Continued)

FOREIGN PATENT DOCUMENTS

| | | |
|---|---|---|
| CN | 102192388 A † | 9/2011 |
| KR | 200253836 Y1 † | 4/2002 |

(Continued)

OTHER PUBLICATIONS

Really Right Stuff 2002 Catalog, 52 pgs.
(Continued)

*Primary Examiner* — Noam Reisner
(74) *Attorney, Agent, or Firm* — Chernoff, Vilhauer, McClung & Stenzel LLP

(57) ABSTRACT

A two-piece extendable L-plate provides clearance between a camera and a quick-release receiver securing the camera to a support permitting a camera having cables connected to the side of the camera's body to be secured in either a landscape or a portrait orientation.

11 Claims, 8 Drawing Sheets

Related U.S. Application Data continuation of application No. 16/267,728, filed on Feb. 5, 2019, now Pat. No. 10,564,526, which is a continuation of application No. 15/606,568, filed on May 26, 2017, now Pat. No. 10,241,383, which is a continuation of application No. 15/048,449, filed on Feb. 19, 2016, now Pat. No. 9,690,171, which is a continuation of application No. 14/723,708, filed on May 28, 2015, now Pat. No. 9,280,039, which is a continuation of application No. 14/656,119, filed on Mar. 12, 2015, now Pat. No. 9,052,574, which is a continuation of application No. 14/024,278, filed on Sep. 11, 2013, now Pat. No. 9,097,962.

(60) Provisional application No. 61/709,371, filed on Oct. 4, 2012.

(51) Int. Cl.
*F16M 11/10* (2006.01)
*F16M 11/14* (2006.01)
*F16M 11/20* (2006.01)
*F16M 13/00* (2006.01)
*F16M 13/02* (2006.01)

(56) References Cited

U.S. PATENT DOCUMENTS

| | | |
|---|---|---|
| 6,196,504 B1 | 3/2001 | Lemke |
| 6,234,653 B1 | 5/2001 | Karton |
| 6,773,172 B1 | 8/2004 | Johnson et al. |
| 7,077,582 B2 | 7/2006 | Johnson |
| 7,588,376 B2 | 9/2009 | Friedrich |
| 7,753,599 B2 | 7/2010 | Segawa et al. |
| 8,662,763 B2 | 3/2014 | Vogt |
| 8,827,574 B2 | 9/2014 | Johnson |
| 9,052,574 B1 | 6/2015 | Johnson |
| 9,097,962 B2 | 8/2015 | Johnson |
| 9,280,039 B2 | 3/2016 | Johnson, Sr. et al. |
| 9,690,171 B2 | 6/2017 | Johnson, Sr. et al. |
| 10,241,383 B2 | 3/2019 | Johnson, Sr. |
| 10,564,526 B2 | 2/2020 | Johnson, Sr. |
| 2010/0142036 A1* | 6/2010 | Sterns .................... G02B 23/16 359/399 |
| 2011/0129210 A1 | 6/2011 | McGucken |
| 2012/0106944 A1 | 5/2012 | Johnson |
| 2012/0281976 A1 | 11/2012 | Vogt |
| 2014/0099093 A1 | 4/2014 | Johnson |
| 2015/0261074 A1 | 9/2015 | Johnson |
| 2016/0170291 A1 | 6/2016 | Johnson, Sr. et al. |
| 2017/0261842 A1 | 9/2017 | Johnson, Sr. |
| 2019/0171090 A1 | 6/2019 | Johnson, Jr. |
| 2020/0133103 A1 | 4/2020 | Johnson, Sr. |

FOREIGN PATENT DOCUMENTS

| | | | |
|---|---|---|---|
| KR | 20020073872 A | † | 9/2002 |
| WO | 2011104063 A1 | | 9/2011 |

OTHER PUBLICATIONS

Author: N/A; Title: Kirk Universal Quick Release Short L-bracket; pp. 1; Publication Date: Jul. 10, 2012; Place of Publication: http://web.archive.org/web/20120710083643/http://www.kirkphoto.com/manuals/QRLB.pdf.

Author: N/A; Title: Further Kirk Universal quick release short L-bracket; pp. 1-6; Publication Date: Feb. 23, 2011; Place of Publication: https://www.bhphotovideo.com/c/product/740839-REG/Kirk_QRLB_T_QRLB_T_Universal_Quick_Release.html/reviews.

Author: N/A; Title: ProMediaGear Nikon D600 Arca-Swiss type L-bracket plate custom fit; pp. 8 screenshots (pp. 1-4); Publication Date: Nov. 23, 2012; Place of Publication: https://www.youtube.com/watch?v=v-6D0fRMjow.

Author: N/A; Title: Kirk Universal Quick Release Short L-bracket; pp. 1; Publication Date: Sep. 2, 2012; Place of Publication: http://web.archive.org/web/20120902155213if_/http://www.kirkphoto.com/Universal_Quick_Release_Short_L-Bracket.htm.

Author: N/A; Title: Kirk Universal Quick Release Tall L-bracket; pp. 1; Publication Date: Jul. 6, 2012; Place of Publication: http://web.archive.org/web/20120706035502/http://www.kirkphoto.com/Universal_Quick_Release_Tall_L-Bracket.html.

Author: N/A; Title: ProMediaGear PLC5D3x; pp. 1-7; Publication Date: Jul. 8, 2013; Place of Publication: https://www.promediagear.com/PLC5D3x-L-Bracket-Canon-5Ds-5DsR-5D-Mark-3-Arca-Swiss-Type-L-Plate_p_122.html.

Author: N/A; Title: ProMediaGear PLND800x; pp. 1-8; Publication Date: Oct. 30, 2013; Place of Publication: https://www.promediagear.com/PLND800x-L-Bracket-Nikon-D800-D810-Arca-Swiss-Type-L-Plate-_p_80.tml.

Author: N/A; Title: ProMediaGear PLX4x L-bracket; pp. 1-11; Publication Date: Feb. 15, 2013; Place of Publication: https://www.promediagear.com/PLX4x-L-Bracket-Universal-4-inch-Arca-Swiss-Type-L-Plate-Designed-for-DSLR-with-Grip-or-Taller-Bodies_p_135.html.

Kirk Universal Quick Release Short L-Bracket as evidenced by: http://web.archive.org/web/20120710083643/http://www.kirkphoto.com/manuals/QRLB.pdf captured by Web Archive on Jul. 10, 2012.†

Kirk QRLB-T Universal Quick Release Tall L-bracket as evidenced by: https://www.bhphotovideo.com/c/product/740839-REG/Kirk_QRLB_T_QRLB_T_Universal_Quick_Release.html/reviews with earliest review (from verified buyer) dated Feb. 23, 2011.†

Novoflex QPL-Vertikal L-Shaped Quick Release Plate as evidenced by: https://www.bhphotovideo.com/c/product/269769-REG/Novoflex_QPL_VERTIKAL_L_Shaped_Quick_Release.html/reviews with earliest review (from verified buyer) dated Nov. 26, 2008.†

Kirk Universal Quick Release Short L-bracket as evidenced by: http://web.archive.org/web/20120902155213if_/http://www.kirkphoto.com/Universal_Quick_Release_Short_L-Bracket.html captured by Web Archive on Sep. 2, 2012.†

Kirk Universal Quick Release Tall L-bracket as evidenced by: http://web.archive.org/web/20120706035502/http://www.kirkphoto.com/Universal_Quick_Release_Tall_L-Bracket.html captured by Web Archive on Jul. 6, 2012.†

Test Des Novoflex Panorama VR-System as evidenced by: https://neunzehn72.de/test-des-novoflex-panorama-vr-system/ dated Jun. 6, 2010.†

\* cited by examiner
† cited by third party

EXTENDIBLE L-PLATE FOR CAMERA EQUIPMENT

CROSS-REFERENCE TO RELATED APPLICATIONS

This application is a continuation of U.S. patent application Ser. No. 16/731,540, filed Dec. 31, 2019, which is a continuation of U.S. patent application Ser. No. 16/267,728, filed Feb. 5, 2019, now U.S. Pat. No. 10,564,526, which is a continuation of U.S. patent application Ser. No. 15/606,568, filed May 26, 2017, now U.S. Pat. No. 10,241,383, which is a continuation of U.S. patent application Ser. No. 15/048,449, filed Feb. 19, 2016, now U.S. Pat. No. 9,690,171, which is a continuation of U.S. patent application Ser. No. 14/723,708, filed May 28, 2015, now U.S. Pat. No. 9,280,039, which is a continuation of U.S. patent application Ser. No. 14/656,119, filed Mar. 12, 2015, now U.S. Pat. No. 9,052,574, which is a continuation of U.S. patent application Ser. No. 14/024,278, filed Sep. 11, 2013, now U.S. Pat. No. 9,097,962, which claims the benefit of U.S. Provisional App. No. 61/709,371, filed Oct. 4, 2012.

BACKGROUND OF THE INVENTION

The present invention relates to a bracket suitable for interconnecting camera equipment and a support for camera equipment and, more particularly, to an L-plate bracket facilitating changing the orientation of a supported camera equipment between landscape and portrait orientations.

Camera equipment often includes a threaded receptacle for attaching the equipment to a head mount of a tripod, monopod or other support. A camera may be attached directly to a head mount of a support by a screw projecting from the head mount but a quick-release mounting system is commonly used to secure camera equipment, particularly higher end camera equipment, to a tripod or other support. A quick-release camera mounting system typically includes a plate that is securable to the camera' body by a screw that is engageable with the threaded receptacle in the bottom of the camera. The screw projecting from the head mount provides a means of securing a receiver to the tripod or other camera support. A projection or taper of the camera plate engages a complementary groove or taper of the receiver and the camera plate is typically secured in the receiver by a clamp or other quick-release mechanism. For example, many makers of photographic equipment utilize a quick-release system developed by camera equipment maker Arca-Swiss, International. The Arca-Swiss or arca-type quick-release system utilizes a dovetail tenon in the form of a 38 mm wide plate having at least two opposing edges sloping at 45 degrees. The plate is receivable and securable in a receiver by opposing sloping dovetail surfaces of a clamp, usually operable by a lever or screw, such as the quick-release clamp described in U.S. Pat. No. 6,773,172. The receiver may be attached to the head mount or, more commonly, to an intermediate attaching device, such as a ballhead, pan head or gimbal head, affixed to the head mount.

A ballhead typically comprises a ball which has a radially projecting stem and which is supported in a socket in the ballhead's body. The body of the ballhead is secured to the head mount of a tripod or other support by the screw projecting from the head mount and engaging a threaded aperture in the bottom of the ballhead's body. Camera equipment or a receiver, such as a clamp of a quick-release system, is attached to the end of the stem projecting from the ball by a screw threaded into a longitudinally extending aperture in the stem. The ball and socket joint enables rotation of the ball in the body of the ballhead and the body, typically, includes a mechanism enabling constriction of the socket to lock the ball and the attached camera equipment in a desired attitude relative to the support. While the ball can be rotated 360° around the longitudinal axis of the stem, rotation in directions transverse to the axis of the stem is limited by interference between the stem and the edge of the ballhead's body.

The body of a ballhead may include one or more drop notches providing clearance for the stem to rotate 90° in a direction transverse to the axis of the stem enabling the camera equipment to be moved from a landscape orientation to a portrait orientation and vice versa. Changing the orientation of camera equipment attached to a ballhead from landscape to portrait or vice versa can be problematic. The camera equipment is offset relative to the center of rotation of the ball and as the ball is rotated in directions transverse to the longitudinal axis of the stem the camera shifts both horizontally and vertically. If the camera equipment is heavy, the horizontal movement of the weight may destabilize the support and the vertical displacement of the camera may make using the viewfinder difficult. In addition, shifting the location of the camera's lens will change the setup for the shot particularly if the subject is close, for example, when shooting a macro. It may be necessary to move the tripod to compensate for the change in the relative positions of the camera and the subject. In addition, if the support is not sitting on a level surface, it may not be possible to rotate the ball far enough to attain the portrait orientation before the stem of the ball makes contact with the bottom of the drop notch.

Attaching camera equipment to a support with an L-plate or L-bracket avoids the need to utilize a ballhead drop notch when switching a supported camera from landscape orientation to portrait orientation or vice versa. An L-plate includes a first portion attachable to the bottom of the camera's body and a second portion partially wrapping around the camera's body to extend normal to the first portion and parallel to the side of the camera's body. Each portion of the L-plate includes a retention feature, for example, a tenon of a dovetail, enabling engagement with a receiver portion, for example, an Arca-Swiss type quick-release clamp, when the camera equipment is in either one of the two perpendicular photographic orientations. To switch a camera from a landscape orientation to a portrait orientation, the photographer releases the quick-release device, rotates the camera ninety degrees, and engages and locks the mounting feature of the second portion of the L-plate in the receiver of the quick release system. The camera's lens is, typically, substantially centered with respect to the longitudinal axis of the L-plate's two mounting features and movement of the lens relative to the head mount of the support is minimized when the camera's orientation is changed.

While an L-plate facilitates photography with a tripod, monopod or other support, use of an L-plate with a digital camera can be problematic. Digital cameras are commonly connectable to remote devices, such as a computer, a printer or a video monitor, for downloading and viewing images and video captured with the camera. In addition, remote accessories, such as a microphone, a flash unit or a remote shutter control switch, may be connected to the camera. The connectors for the cable assemblies connecting these remote devices to the camera are commonly located behind one or more doors on the side of the camera's body and when the L-plate and camera are turned for the portrait orientation, there is, typically, insufficient distance between the body of the camera and the L-plate and/or the receiver of the quick-release system to accommodate passage of the cable assembly(ies) connecting the camera to the remote device(s). A cable relief spacer may be inserted between the L-plate and the receiver to provide clearance for connectors and cables but this is, typically, a small, loose piece which can be easily misplaced and may not be carried with the camera equipment and, therefore, may be unavailable when needed.

What is desired therefore is a mounting device that permits the orientation of supported camera equipment to be changed without the need to carry a separate piece of equipment to provide clearance for cabling connecting the camera to a remote device.

DETAILED DESCRIPTION OF PREFERRED EMBODIMENTS

Figure 1:
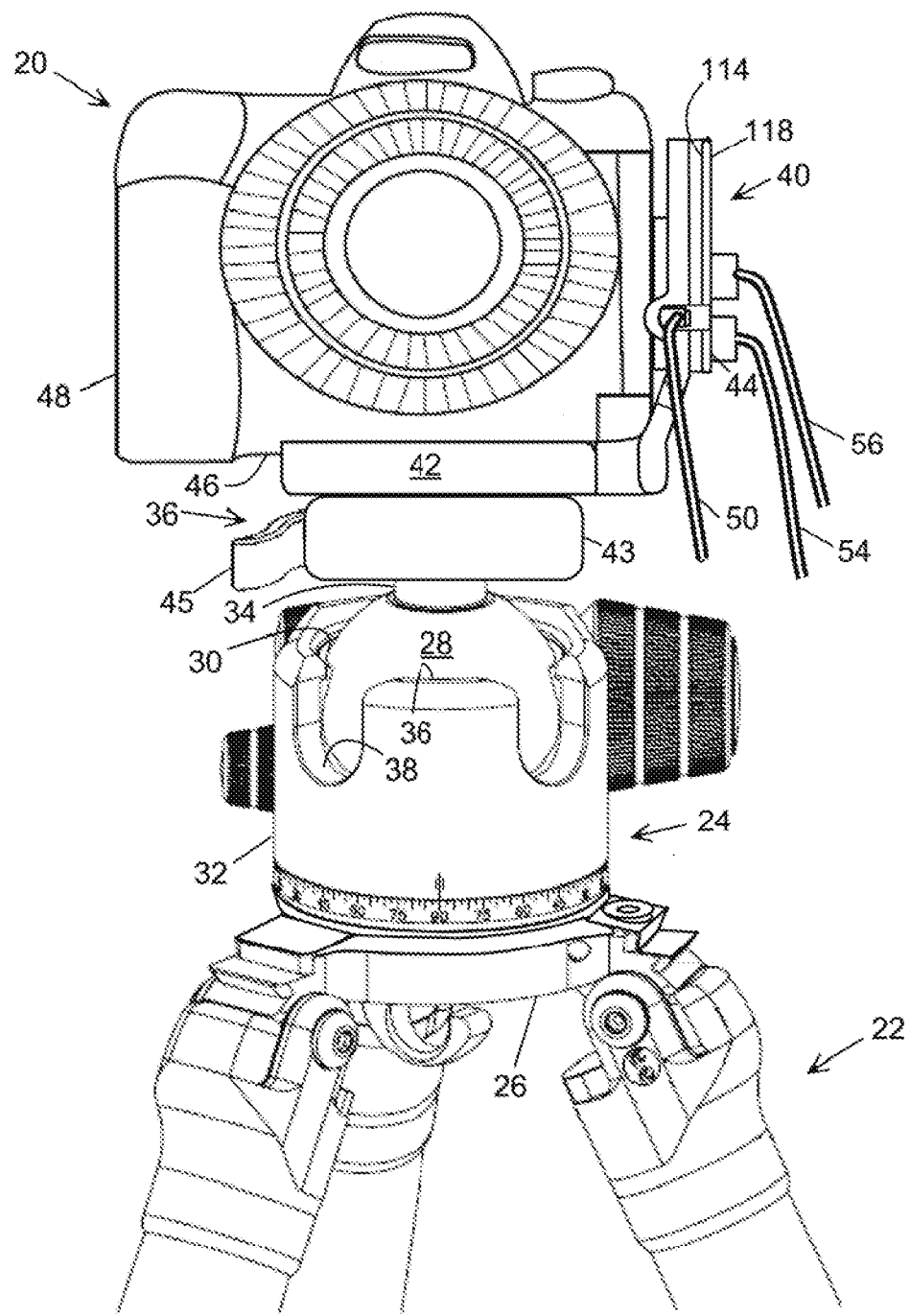
FIG. 1 is a front elevation view of a camera attached in a landscape orientation to a tripod mounted ballhead with an extendible L-plate.
Figure 4:
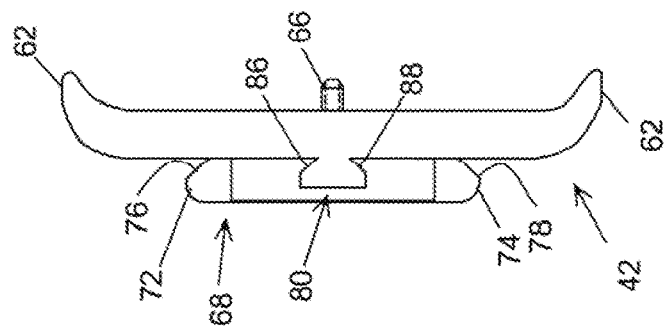
FIG. 4 is an elevation view of the end of the base plate opposing the end of FIG. 2.
Figure 3:
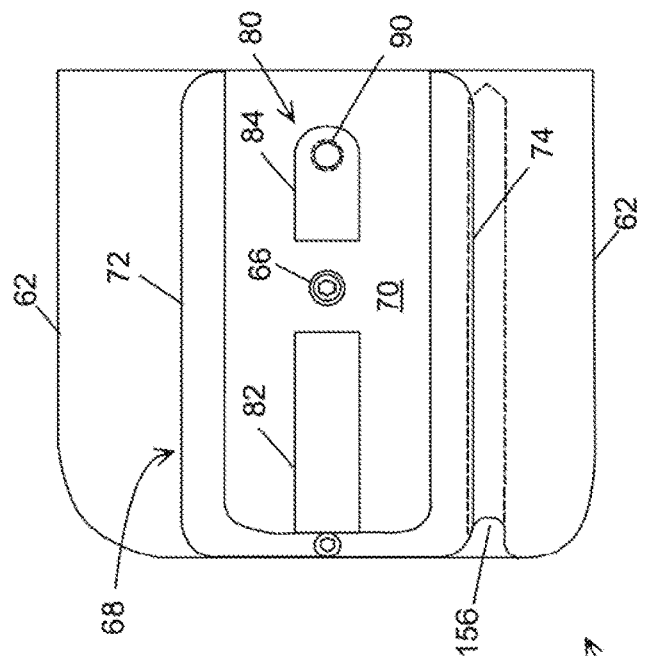
FIG. 3 is a plan view of the bottom of the base plate of FIG. 2.

Referring in detail to the drawings where similar parts are identified by like reference numerals, and, more particularly to FIG. 1, to provide stability and to reduce blurring, photographic equipment 20, for example, a camera body 48, a lens and one or more accessories, is often affixed to a support, such as a tripod 22 or monopod. While camera equipment 20 can be attached directly to a tripod 22 or other support, cameras are commonly affixed to a support with an intermediate device, such as a ballhead 24, pan head or gimbal head which is usually secured to the head mount 26 of the support by a screw that projects upward through the head mount into threaded engagement with a threaded aperture in the body of the intermediate device. A ballhead 24 comprises generally a ball 28 which is retained in a socket 30 in the ballhead's body 32. The ball 28 typically includes a radially projecting stem 34 to which the photographic equipment or a receiver of a quick-release system is attached. The ball-in-socket joint enables unlimited rotation of the ball about the longitudinal axis of the stem 34 and limited rotation of the ball in directions transverse to the stem's axis. The ballhead's body 32 typically includes a mechanism enabling constriction of the socket to hold the ball and the camera equipment in a position desired by the photographer.

Rotation of the ball 28 in directions transverse to the longitudinal axis of the stem 34, is limited by interference between the stem and the upper edge 36 of the ballhead's body. The bodies of many ballheads include one or more drop notches 38 in the upper surface of the body to provide additional clearance for the stem enabling the orientation of the camera to be shifted between a landscape orientation with the lower surface 46 of the camera's body 48 arranged substantially horizontal and a portrait orientation with the lower surface arranged substantially vertical. However, utilizing a drop notch of a ballhead to change camera orientation can be problematic because the location of the lens and the center of mass of the photographic equipment move horizontally and vertically as the camera is rotated about the center of the ball in directions transverse to the longitudinal axis of the stem. This can cause the support to become unstable and may substantially alter the setup of a shot, particularly when the subject to be photographed and the camera are close to each other.

FIG. 1 illustrates a photographic equipment mounting assembly 40, commonly referred to as an L-plate or L-bracket, comprising a base member or plate 42 and a side member or plate 44 projecting substantially normal to the base plate to wrap around and extend parallel to the side of the camera's body 48. Referring also to FIGS. 2, 3, 4, 5, 6 and 7, the base plate 42 of the extendible L-plate 40 preferably has an upper camera body interface portion 60 adapted to receive and restrain the lower surface 46 of the body 48 of a camera. At least one of the edges 62 of the upper portion 60 of the base plate preferably projects upward from the longitudinal center 64 of the upper portion to define a shallow receptacle shaped for close fitting engagement with the lower surface of the camera's body. This receptacle restrains the camera against twisting about an axis normal to the surface of the upper portion without the need for an intervening layer of friction material which could enhance vibrational freedom of the camera. The interface portion of the base plate also includes a feature enabling the base plate to be secured to the body of the camera. While other securing features such as a latch might be used to secure a camera to a base plate, cameras commonly include a threaded aperture in the lower portion of the body which is engageable by a screw 66 that projects upward through the upper surface of the base plate 42. Preferably, the screw is secured in the base plate. For example, the screw may include a shank with an unthreaded portion proximate the screw's head which permits the screw to rotate in a tapped hole in the base plate without backing out.

Figure 5:
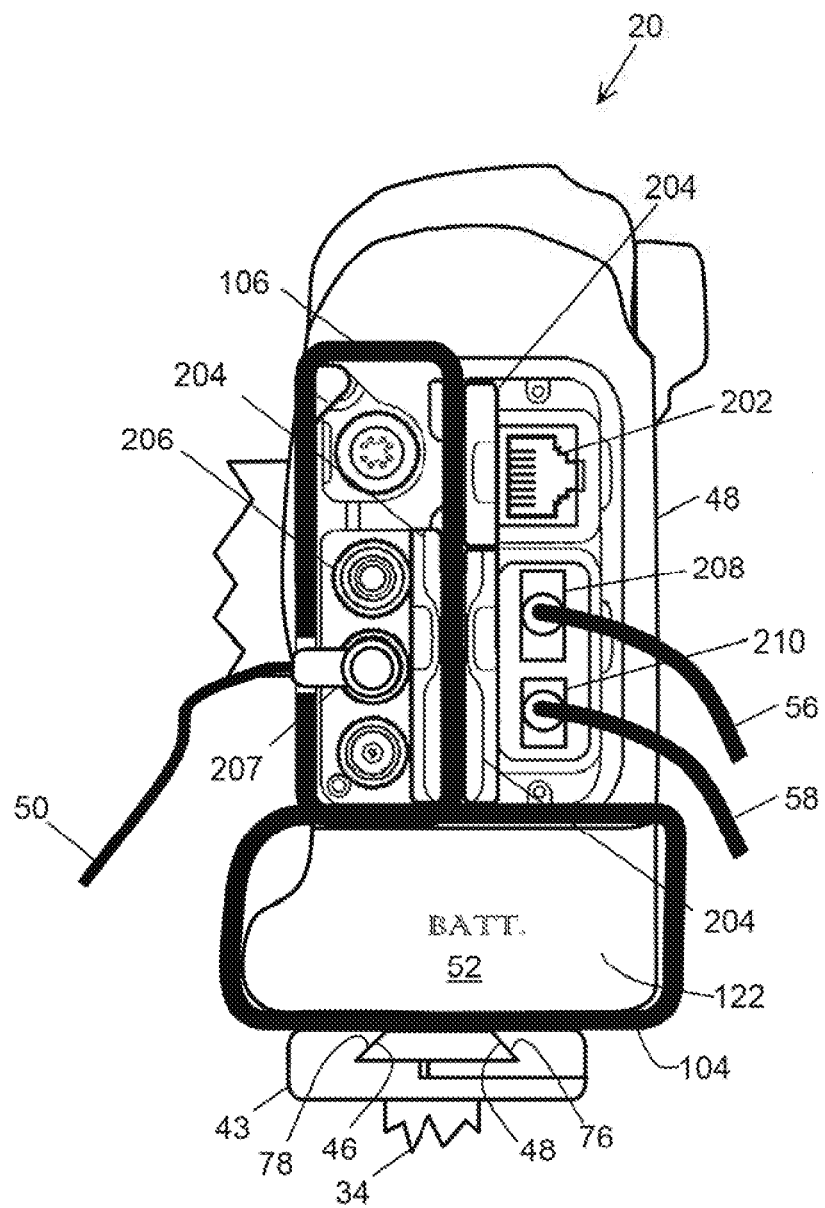
FIG. 5 is an elevation view of the side of a camera attached to the extendible L-plate of FIG. 1.
Figure 6:
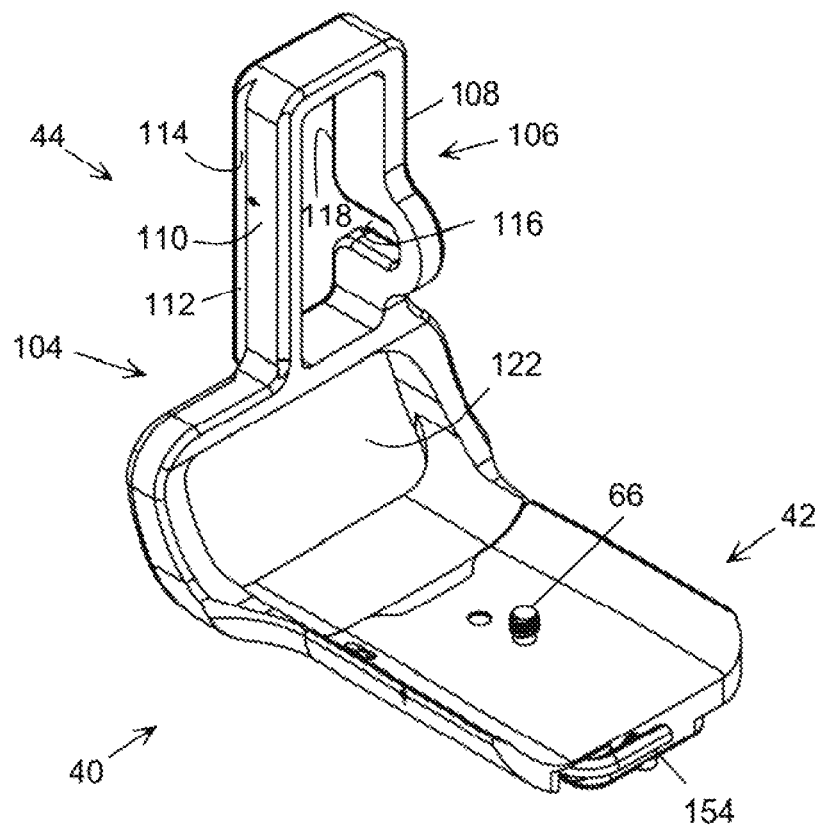
FIG. 6 is a perspective view of an extendible L-plate.
Figure 7:
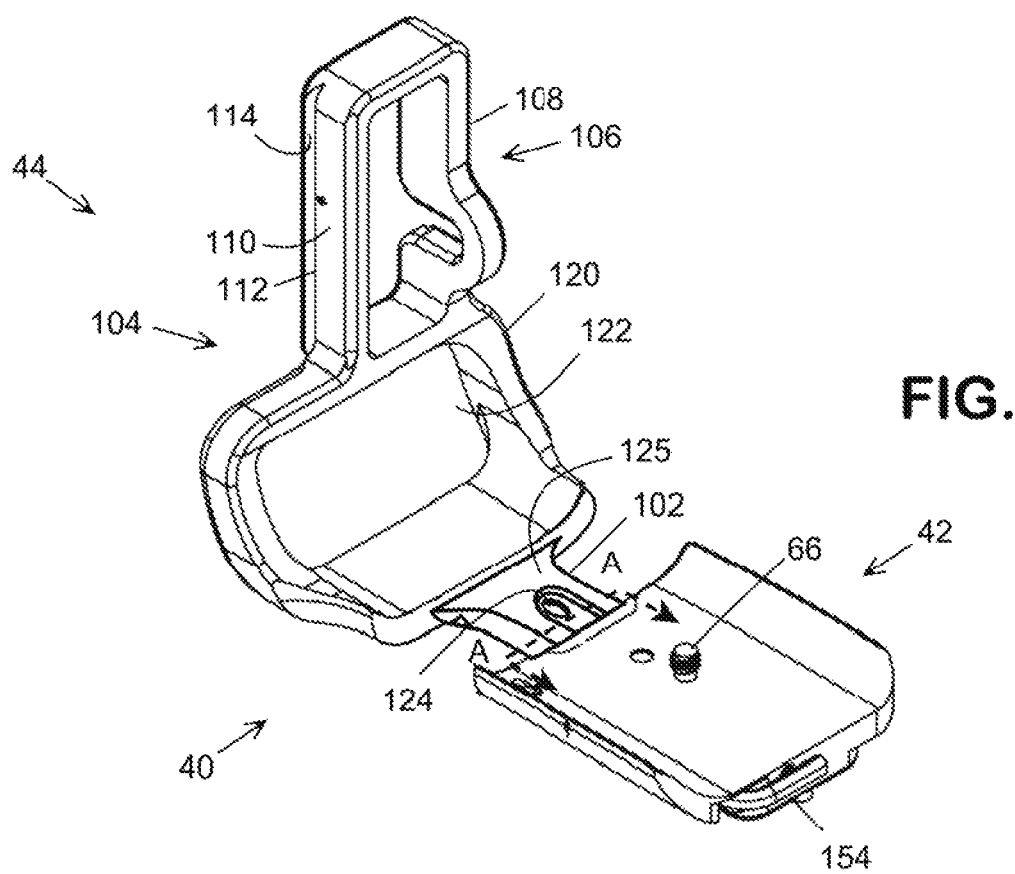
FIG. 7 is a perspective view of the extendible L-plate of FIG. 6 with the base plate and side plate in an extended position.

The lower portion of the base plate 42 includes an L-plate retention feature comprising a first central raised portion 68 having depressed central portion 70 and a general shape, in a plan view, of the letter U. Opposing peripheral surfaces of the legs 72, 74 of the first raised portion 68 each comprise a surface portion 76, 78 sloping (e.g., arranged at a forty-five degree angle) so that the cross-section of the first central raised portion has the shape and dimension of a dovetail tenon and, preferably, the tenon portion of an Arca-Swizz quick-release system. Camera equipment may be attached to a ballhead 24 or other attaching device in the landscape orientation by engaging the base plate 42 of the L-plate 40 with a receiver 36 of a quick-release system, for example, a clamp of the Arca-Swizz quick-release system, which is attached to the stem 34 of the ballhead. Referring also to FIG. 5, to secure the base plate 42 in the receiver 36, the Arca-Swizz receiver typically comprises a lever 45 or screw operated clamping body 43 with sloping opposed jaw surfaces 48 arranged to engage and clamp the sloping surfaces 76, 78 of the base plate 42.

A side plate engagement portion, a second central raised portion 80, projects outward at the longitudinal center of the depressed central portion 70 of the first raised portion 68. The second central raised portion is discontinuous comprising a first portion 82 and a second portion 84 enabling location of the camera securing element, screw 66, at the center 64 of the base plate. Opposing sides of the second raised portion 80 also include surface portions 86, 88 that slope toward the longitudinal center of the second raised portion so that the second raised portion also has a cross-section of a dovetail tenon.

The side plate 44 of the L-plate 40 includes a lower leg 102 and an upper leg 104 which includes a first portion 106 that projects substantially normal to the lower leg. In an elevation view, the first portion 106 of the exemplary side plate has the general shape of a rectangular tube section defining a central aperture. The generally parallel vertical sides 108, 110 of the first portion 106 have generally rectangular cross-sections with opposing peripheral surfaces each including a slot-like feature 112 comprising a surface portion 114 sloping (e.g., arranged at a forty-five degree angle). The first portion 106 comprises second L-plate retention feature securable by engagement with the receiver having a cross-section the shape of a dovetail tenon and, preferably, the tenon element of an Arca-Swizz quick-release system. In the exemplary L-plate, one side 108 of the first portion 106 of the upper leg 104 also an offset surface portion 116 in a receiver engaging surface 118. The offset surface portion 116 is arranged to accept a portion of a cable assembly 50 connectable to a remote camera control switch or other camera accessory (not shown) when the engaging surface 118 is in contact with a receiver. A second portion 120 of the upper leg 104 of the exemplary L-plate connects the first portion 106 with the lower leg 102. In elevation, the second portion 120 of the upper leg 104 is also generally the shape of a section of rectangular tubing defining an aperture 122 providing access to the camera's battery which is concealed behind a cover 52 in the side of the camera's body.

Figure 8:
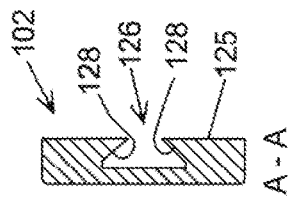
FIG. 8 is a cross-section of the leg portion of the side plate of FIG. 7 taken along line A-A.
Figure 2:
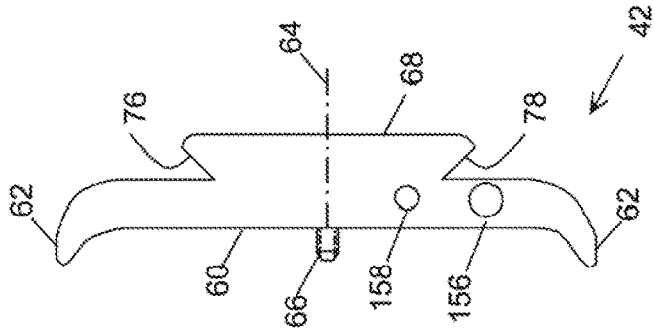
FIG. 2 is an elevation view of a first end of a base plate of an extendible L-plate.

Referring also to FIG. 8, the lower leg 102 of the side plate 44 has a generally rectangular cross-section preferably having a dimension approximating the width of the depressed central portion 70 of the base plate 42. The upper surface 125 of the lower leg 102 includes a depressed central portion 126 extending approximately the length of the raised second portion 80 of the base plate. The depressed central portion 126 of the lower leg has opposed sloping sides 128 defining a shape of a dovetail mortise engagement portion which is arranged to engage slidingly with the dovetail tenon defined by the raised second portion 80 of the base plate 42.

Figure 9:
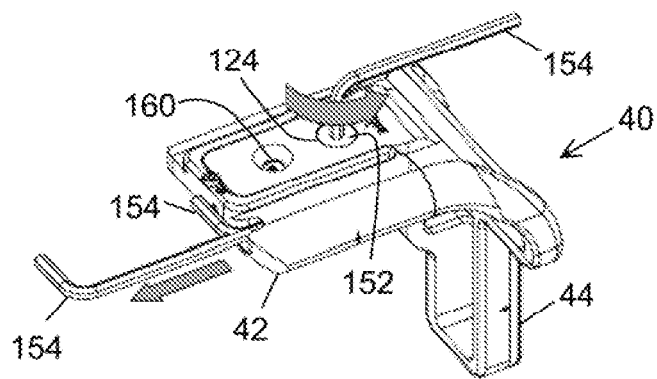
FIG. 9 is a perspective view of the bottom of the L-plate of FIG. 6 illustrating separation of the side plate and the base plate.
Figure 10:
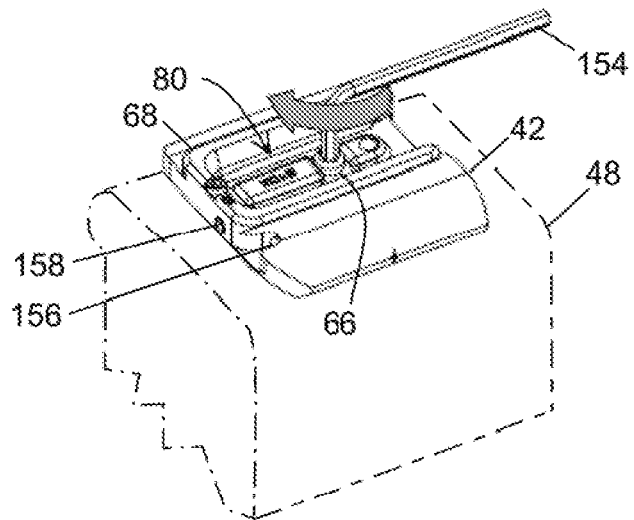
FIG. 10 is a perspective view of the bottom of the base plate of FIG. 6 illustrating the securing of a camera to the base plate.
Figure 11:
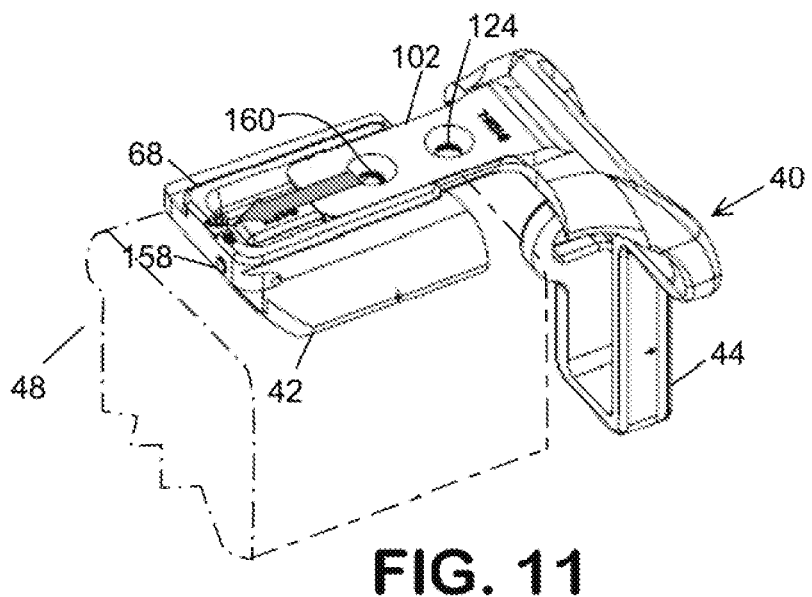
FIG. 11 is a perspective view of the bottom of the L-plate of FIG. 6 illustrating assembly of the side plate and the base plate.

Referring also to FIGS. 9, 10 and 11, a camera is attached to the camera mounting assembly 40 by removing a securing element, a screw 152, that extends through an aperture 124 in the lower leg 102 of the side plate 44 into threaded engagement with a tapped hole 90 in the base plate 42 and separating the base plate 42 and the side plate 44. For convenience and security a tool 154, preferably a hexagonal key, useful in removing and installing the screw 152 is removably stored in the base plate. A first portion of the tool 154 is inserted into a cavity 156 extending longitudinally into the base plate 42 from the end of the base plate. Preferably, the tool is steel and includes a second portion projecting normal to the first portion which can be arranged approximately co-planar with the base plate. The steel tool can be secured in the cavity by a magnet 158 inset in the end of the base plate 42. The tool 154 is removed from the storage cavity and used to loosen and remove the screw 152 enabling the base plate 42 and the side plate 44 to be separated by sliding the two plates apart.

The camera mounting screw 66 is retained in the base plate 42 and projects from the upper surface of the base plate for threaded engagement with a threaded mounting hole in the bottom 46 of camera body 48. The tool 154 can be used to tighten the mounting screw.

Figure 12:
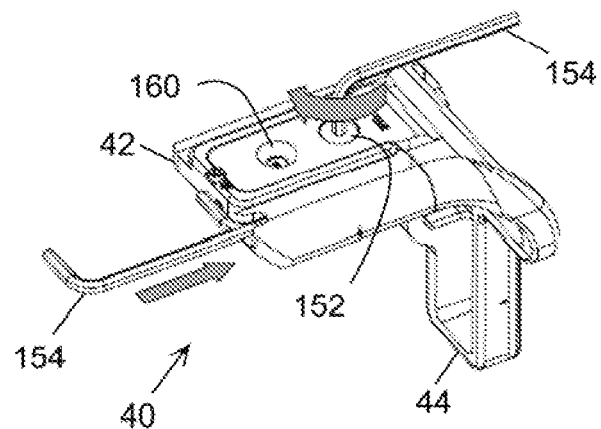
FIG. 12 is a perspective view of the bottom of the L-plate of FIG. 6 illustrating securing of the side plate and the base plate.

Referring also to FIG. 12, the extendible L-plate 40 is re-assembled, by inserting the lower leg 102 of the side plate 44 into the central depression 70 of the base plate 42 to engage the first engagement portion, the dovetail tenon portion 80 of the base plate, with the cooperating second engagement portion, the dovetail mortise in the lower leg 102 of the side plate 44. The side plate 44 is secured to the base plate 42 by inserting the screw 152 through the aperture 124 in the lower leg 102 of the side plate and engaging threads within the aperture 90 in the base plate.

Figure 14:
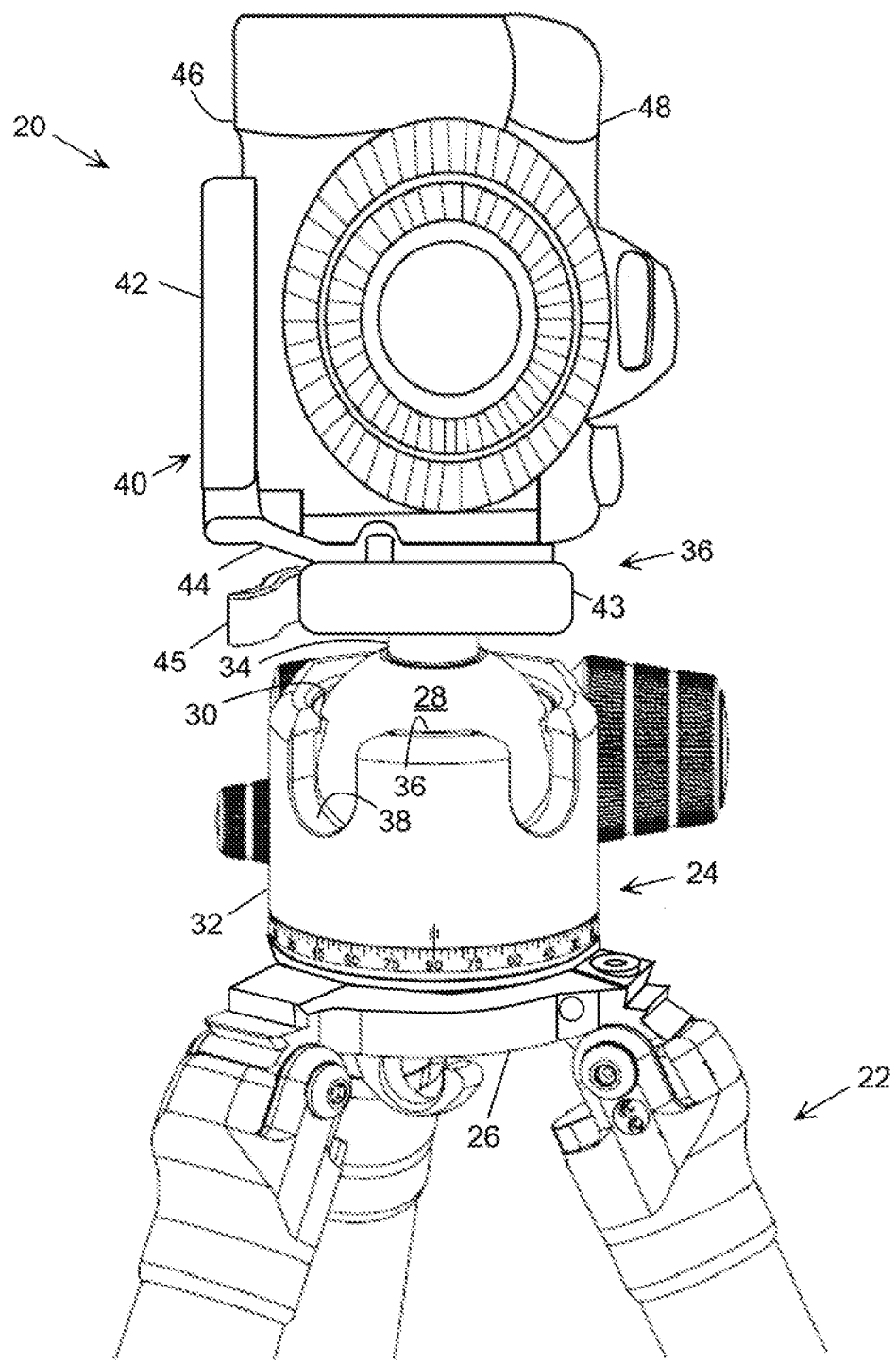
FIG. 14 is a front elevation view of a camera attached in a portrait orientation to a tripod mounted ballhead with a collapsed extendible L-plate.

Referring to FIG. 1, the camera equipment 20 can be attached to a tripod 22, monopod, or other support in the landscape orientation, e.g. the bottom surface 46 of the camera's body 48 substantially horizontal, by engaging the dovetail tenon of the first raised portion 68 of the base plate 42 with the cooperating dovetail clamping surfaces 46, 48 of a clamp portion 43 of a quick-release receiver 36 affixed to the support. To switch the camera to the portrait orientation, e.g. with the bottom surface 46 of the camera substantially vertical, the user releases the clamp of the quick-release receiver and disengages the dovetail tenon of the base plate from the receiver. Referring to FIG. 14, if the camera is not attached to a remote device by cabling that would interfere with the receiver, the camera equipment 20 can be rotated to the portrait orientation and the dovetail surfaces of the side plate 44 inserted into the clamping body 43 of the receiver 36 and secured.

Figure 13:
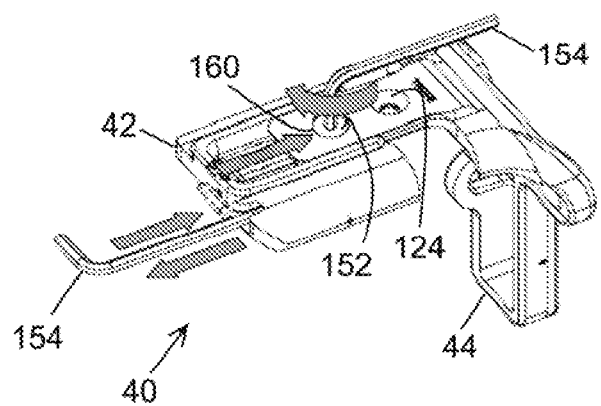
FIG. 13 is a perspective view of the bottom of the L-plate of FIG. 6 illustrating securing of the side plate and the base plate in the extended position.
Figure 15:
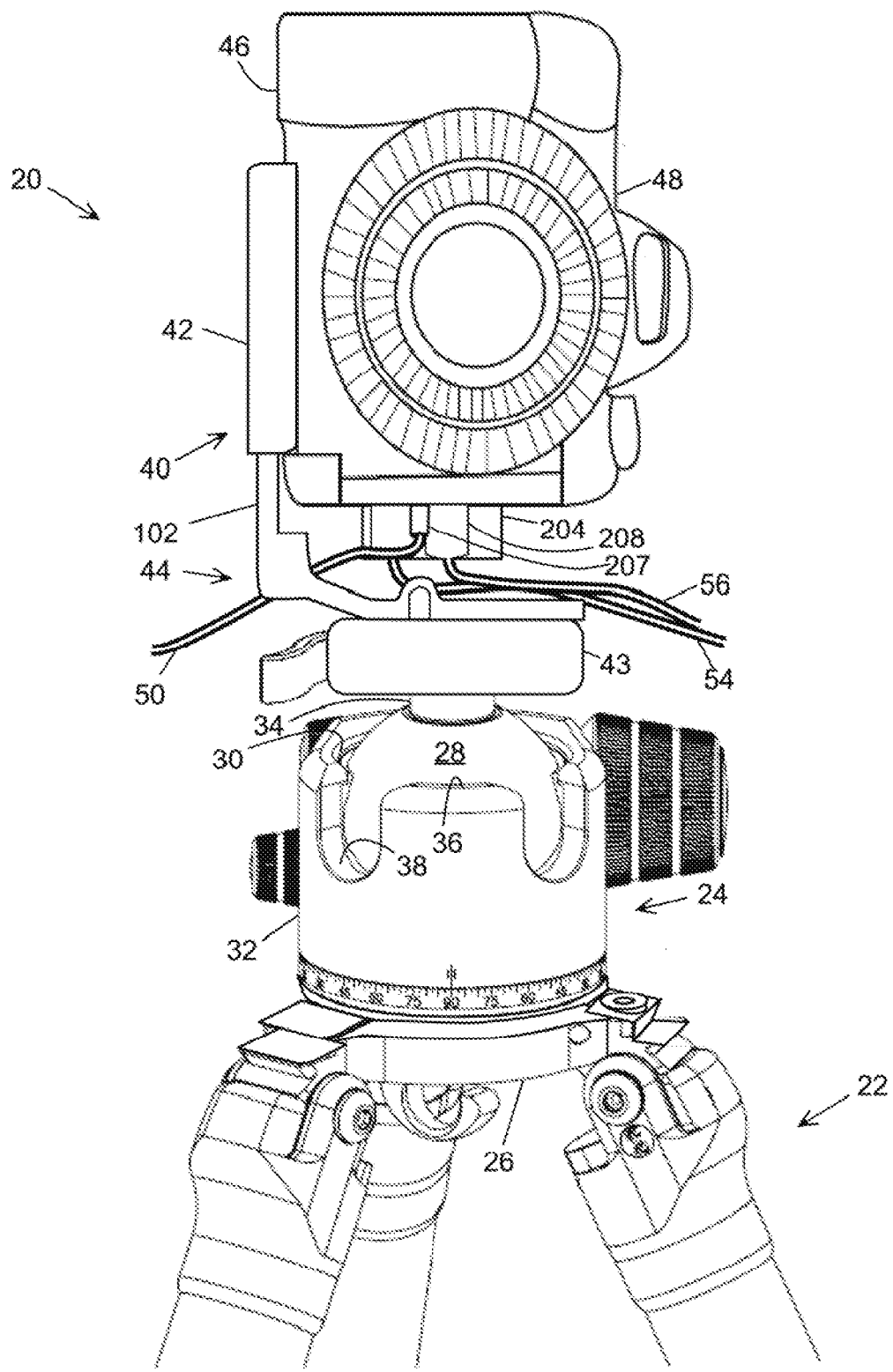
FIG. 15 is a front elevation view of a camera attached in a portrait orientation to a tripod mounted ballhead with an extended extendible L-plate.

However, it may be desirable to connect the camera to one or more remotely located accessories, such as a microphone, shutter control switch or a flash unit. In addition, digital cameras are commonly connected to remote devices, such as, a computer, printer or video monitor to enable transferring and viewing images and video captured with the camera. To enable communication with remote devices and accessories, a digital camera commonly includes portions of one or more cable connectors, such as an Ethernet connector 202 or an N-type connector 206, located behind one or more doors 204 in the side of the camera's body 48. For example, referring again to FIG. 1, plural cable assemblies 50, 54, and 56 connect the exemplary camera equipment 20 to one or more remote devices or accessories (not shown). Each cable assembly includes an appropriate connector portion, such as, a universal serial bus (USB) connector 208, a high definition multi-media interface (HDMI) connector 210, an N-type connector 207 or other connector utilized in communicating with the specific remote device or accessory. As illustrated in FIG. 1, connectors and cables of some cable assemblies 54, 56 extend distal of the engaging face 118 of the side plate 44 and would interfere with the receiver 36 if the camera was turned to the portrait orientation. A cable relief spacer could be inserted between the engaging face 118 of the side plate 44 and the receiver if cables are to be connected to a camera in a portrait orientation, but a cable relief spacer is a small, loose piece that is easily misplaced or left behind. The inventor concluded that a separate piece of equipment to provide clearance for connecting cables to a camera in the portrait orientation was unnecessary if the distance between the engaging face 118 of the side plate 44 and the camera interface portion of the L-plate, for example, the distance to between the engaging face and the mounting screw 66 in the base plate 42, could be extended when necessary. Referring to FIGS. 12 and 13, to extend the L-plate 40, the user removes the tool 154 from the storage cavity 156 in the base plate and unscrews the screw 152 the base plate 42 to the side plate 44. With the screw removed, the base plate and the side plate to be slid away from each other while remaining connected by the cooperating dovetail portion 80 of the base plate and the dovetail portion 26 of the lower leg 102. The screw 152 is inserted in a second aperture 160 in the lower leg 102 of the base plate and threaded into engagement with the threaded aperture 90 in the base plate 42 to secure the base plate 42 and the side plate 44 in the extended position. Referring to FIG. 15, by extending the L-plate 40, clearance can be provided between the camera's body 48 and the side plate 44 providing clearance for cable assemblies projecting from the side of the camera body.

The two-piece extendable L-plate provides clearance between a camera body and the apparatus securing the camera to a support for cables connected to the side of the camera permitting the camera to be supported on a tripod or other support in either landscape or portrait orientation without the use of a separate spacer element.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A mounting assembly for mounting photographic equipment on a receiving apparatus, said mounting assembly including:

(a) a base member including a portion defining a retention structure engageable and securable with said receiving apparatus, a photographic equipment interface portion, said retention structure forming an opposite pair of lower edges;

(b) a side member including a portion defining another retention structure engageable and securable with said receiving apparatus and a connecting member projecting substantially normal to said another retention structure and said side member in a perpendicular orientation, said connecting member engageable with said base member, said another retention structure forming an opposite pair of side edges, wherein said another retention structure of said side member is incapable of being moved in a direction perpendicular to said base member when said side member is engaged with said base member;

(c) said opposite sides of said side edges defined by said side member defining an open region therebetween from one side of said side member to the other side of said side member along a majority of the length of said side edges;

(d) said connecting member slidably engaged with said base member while being maintained within at least a portion of said base member;

(e) a first fastening element configured to detachably fasten together said side member and said base member such that when the lower surface of the photographic equipment is supported by the base member, at least a portion of the side member is aligned with a side surface of the photographic equipment and configured such that a pair of moveable jaws of an engagement mechanism is selectively engageable with said lower edges and said side edges to adjustably mount the photographic equipment in a landscape orientation and a portrait orientation, respectively, while maintaining the photographic equipment in a generally centered position over the vertical support, said first fastening element comprising a rotatable member accessible from a lower surface of said base where rotation of said rotatable member detachably interconnects said connecting member to said base member in a manner such that said side member may be selectively secured to said base member at a plurality of different distances from said side surface of the photographic equipment, said base member being free from extending along a substantial portion of said side surface of said photographic equipment when said photographic equipment is supported by said base member and said side member is detached from said base member;

(f) a second fastening element engaged with said base member and extending proud of said photographic equipment interface portion arranged such that said second fastening element is securable to a threaded opening defined in the lower surface of said photographic equipment, where said second fastening element is a threaded screw, a head of said second fastening element engaged with an opposing surface of said base member relative to said photographic equipment interface portion when said second fastening element is secured to said photographic equipment, said another retention structure is slidable engaged with said base member in such a manner that a terminal end of said another retention structure passes over said head of said second fastening element as said another retention structure is positioned with respect to said base member for said first fastening element to fasten together said side member and said base member, said head of said second fastening element is not visible from below said mounting assembly when said another retention structure is positioned over said head of said second fastening element and secured to said base member by said first fastening element.

2. The mounting assembly of claim 1 wherein said first fastening element is a threaded screw.

3. The mounting assembly of claim 1 further comprising a portion of a peripheral edge portion of said photographic equipment interface portion projecting upward from a longitudinal center of said photographic equipment interface portion to define a shallow receptacle suitable for mounting said photographic equipment where said portion of said peripheral edge is configured such that said portion of said peripheral edge extends upward along a portion of said photographic equipment supported by said photographic equipment interface portion.

4. The mounting assembly of claim 1 wherein said another retention feature includes discontinuous first and second portions.

5. The mounting assembly of claim 1 wherein the side member includes a side arm and a lower arm in a generally L-shaped arrangement, the side arm being aligned with the side surface of the photographic equipment when the lower surface of the photographic equipment is supported by said base member.

6. The mounting assembly of claim 5 wherein the lower arm has a length shorter than the length of both the base member and the side arm.

7. The mounting assembly of claim 6 wherein the lower arm is integral with the side arm.

8. The mounting assembly of claim 1 wherein said opposite pair of lower edges are dovetailed slots.

9. The mounting assembly of claim 1 wherein said opposite pair of side edges are dovetailed slots.

10. The mounting assembly of claim 1 further comprising said receiving apparatus.

11. The mounting assembly of claim 1 further comprising said photographic equipment.

* * * * *